United States Patent [19]

Blum et al.

[11] Patent Number: 5,302,458

[45] Date of Patent: Apr. 12, 1994

[54] ADHESION PROMOTER

[75] Inventors: Rainer Blum, Ludwigshafen; Hans J. Heller, Hamburg; Hans-Joachim Haehnle, Ludwigshafen; Klaus Lienert, Hamburg, all of Fed. Rep. of Germany

[73] Assignee: BASF Lacke + Farben Aktiengesellschaft, Munster, Fed. Rep. of Germany

[21] Appl. No.: 86,314

[22] Filed: Jul. 6, 1993

Related U.S. Application Data

[62] Division of Ser. No. 873,197, Apr. 24, 1992.

[30] Foreign Application Priority Data

Apr. 26, 1991 [DE] Fed. Rep. of Germany ....... 4113655

[51] Int. Cl.$^5$ ............................................. B32B 27/04
[52] U.S. Cl. .................................. 428/429; 428/447; 428/473.5
[58] Field of Search ...................... 428/429, 447, 473.5

[56] References Cited

U.S. PATENT DOCUMENTS

| | | | |
|---|---|---|---|
| 3,705,911 | 12/1972 | Thomson | 260/349 |
| 3,715,371 | 2/1973 | Thomson | 534/558 |
| 4,038,456 | 7/1977 | Marsden et al. | 428/447 |
| 4,055,701 | 10/1977 | Marsden et al. | 428/391 |
| 4,277,593 | 7/1981 | Scheve | 428/429 |
| 4,447,495 | 5/1984 | Engle, III | 428/429 |
| 5,252,403 | 10/1993 | Blum et al. | 428/447 |

FOREIGN PATENT DOCUMENTS

| | | |
|---|---|---|
| 1260913 | 9/1989 | Canada . |
| 0050768 | 5/1982 | European Pat. Off. . |
| 3623759 | 5/1987 | Fed. Rep. of Germany . |
| 1377214 | 12/1974 | United Kingdom . |
| 1516193 | 6/1978 | United Kingdom . |

OTHER PUBLICATIONS

Patent Abstracts of Japan, JP-A-3012346, Jan. 21, 1991, "Surface Treating Agent For Glass Fiber".

*Primary Examiner*—Michael Lusignan
*Assistant Examiner*—Erma Cameron
*Attorney, Agent, or Firm*—Oblon, Spivak, McClelland, Maier & Neustadt

[57] ABSTRACT

Use of a mixture of from 5 to 95% by weight of an azidosilane of the formula $$N_3-R^3-Si-R^1{}_n(OR^2)_{3-n} \qquad I$$

where $R^1$ is $C_1$-$C_3$-alkyl, phenyl, benzyl or tolyl, $R^2$ is $C_1$-$C_4$-alkyl, $C_2$-$C_4$-alkoxyalkyl, phenyl or benzyl, $R^3$ is $C_1$-$C_8$-alkylene, which may be interrupted by oxygen, sulfur or $-(N-R^4)-$ in which $R^4$ is hydrogen, methyl, ethyl or phenyl, and n is 0, 1 or 2, and from 5 to 95% by weight of an aminoalkoxysilane of the formula $$H_2N-R^5-Si-R^6{}_m(OR^7)_{3-m} \qquad (II)$$

where $R^5$ is $C_1$-$C_6$-alkylene, $C_5$-$C_6$-cycloalkylene or $C_5$-$C_6$-arylene, each of which may be additionally substituted by one or two $C_1$-$C_3$-alkyl groups, and $R^6$ and $R^7$, independently of one another, are $C_1$-$C_6$-alkyl or $C_5$-$C_6$-cycloalkyl, each of which may likewise be additionally substituted by one or two $C_1$-$C_3$-alkyl groups, and m may be 0, 1 or 2, as an adhesion promoter between polycondensates containing, as structural units, heterocyclic ring systems containing nitrogen atoms, or precursors of these polycondensates, and inorganic substrates.

3 Claims, No Drawings

ADHESION PROMOTER

This is a division of application Ser. No. 07/873,197, filed on Apr. 24, 1992.

The present invention relates to a process for improving the adhesion of polycondensates containing, as structural units, heterocyclic ring systems containing nitrogen atoms, or precursors of these polycondensates, to inorganic substrates, which, comprises using, as adhesion promoter, a mixture of from 5 to 95% by weight of an azidosilane of the formula

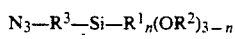

where $R^1$ is $C_1$-$C_3$-alkyl, phenyl, benzyl or tolyl, $R^2$ is $C_1$-$C_4$-alkyl, $C_2$-$C_4$-alkoxyalkyl, phenyl or benzyl, $R^3$ is $C_1$-$C_8$-alkylene, which may be interrupted by oxygen, sulfur or —(N—$R^4$)— in which $R^4$ is hydrogen, methyl, ethyl or phenyl, and n is 0, 1 or 2, and from 5 to 95% by weight of an aminoalkoxysilane of the formula

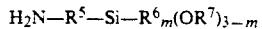

where $R^5$ is $C_1$-$C_6$-alkylene, $C_5$-$C_6$-cycloalkylene or $C_5$-$C_6$-arylene, each of which may be additionally substituted by one or two $C_1$-$C_3$-alkyl groups, and $R^6$ and $R^7$, independently of one another, are $C_1$-$C_6$-alkyl or $C_5$-$C_6$-cycloalkyl, each of which may likewise be additionally substituted by one or two $C_1$-$C_3$-alkyl groups, and m may be 0, 1 or 2.

Polycondensates which contain, as structural units, heterocyclic ring systems containing nitrogen atoms, e.g. polyimides, are increasingly being employed for coating metal wires, glass fibers and quartz fibers, and silicon substrates, with or without modified surfaces of silicon dioxide or silicon nitride, since demands on the heat resistance of such coatings, for example in electronics and microelectronics, have constantly risen.

In order to ensure adequate adhesion of such coatings, the inorganic substrates must be pretreated with adhesion promoters, usually aminoalkoxysilanes, which are applied in the form of dilute alcoholic or alcoholic/aqueous solutions.

After removal of the solvent, the coating, such as polyimide, or a soluble precursor thereof is applied in a further step.

In addition to aminoalkoxysilanes, azidosilanes are also of interest as adhesion promoters.

U.S. Pat. No. 3,705,911 describes silyl azidoformates, which are employed to improve the adhesion of polymers to inorganic substrates.

GB-B-1,377,214 and GB-B-1,516,193 disclose similar azidoformates as adhesion promoters.

EP-B-50768 relates to a process for the preparation of azidosilanes of the formula

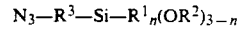

where $R^1$ to $R^3$ are as defined above and may be, for example, short-chain alkyl or alkylene.

The earlier German Patent Application P 4107664.8, which was not published before the date of filing of this application, discloses solutions of polycondensates with N-containing heterocyclic ring systems, and azidosilanes as adhesion promoters.

The adhesion promoters disclosed hitherto still produce inadequate adhesion for many polyimides.

It is an object of the present invention to improve the adhesion of polyimides to inorganic substrates.

We have found that this object is achieved by the process described above. We have also found inorganic substrates coated with the abovementioned mixtures.

Further embodiments of the invention are given in the subclaims.

The mixture for improving the adhesion of polycondensates containing, as structural units, heterocyclic ring systems containing nitrogen atoms contains
from 5 to 95% by weight, in particular from 20 to 80% by weight, particularly preferably from 30 to 70% by weight, of an azidosilane of the formula I and
from 5 to 95% by weight, in particular from 20 to 80% by weight, particularly preferably from 30 to 70% by weight, of an aminoalkoxysilane of the formula II.

The mixture preferably contains aliphatic azidosilanes, particularly preferably those where $R^2$ is $C_1$-$C_4$-alkyl, $R^3$ is $C_1$-$C_6$-alkylene and n is 0. Very particular preference is given to 3-azidopropyltriethoxysilane.

In preferred aminoalkoxysilanes, $R^5$ is $C_1$-$C_6$-alkylene, $R^7$ is $C_1$-$C_6$-alkyl and m is 0.

Examples of suitable polycondensates are polybenzimidazoles, polybenzothiazoles, polybenzoxazoles, polyoxazinediones, polyquinazolinediones and polyisoindoloquinazolinediones. Processes for the preparation of these polycondensates are given, for example, in DE-A-29 33 826 and DE-A-23 11 659.

The polyoxazinediones are polycondensates which contain recurring structural units

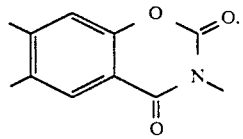

and are obtainable by reacting dihydroxydicarboxylic acids and diisocyanates.

The polyquinazolinediones contain recurring structural units

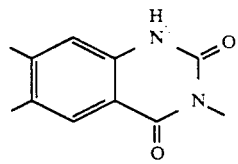

and are obtainable by reacting diaminodicarboxylic acids and diisocyanates.

The polyisoindoloquinazolinediones contain recurring structural units

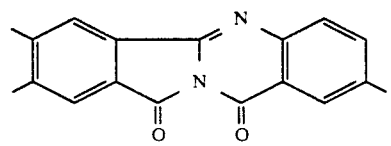

and are obtainable by reacting tetracarboxylic dianhydrides with o-aminoamides.

The recurring structural units in the polybenzoxazoles and polybenzothiazoles are

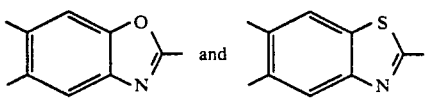

respectively. The polybenzoxazoles and polybenzothiazoles can be obtained, for example, by reacting dicarboxylic acids with di-o-aminophenols or di-o-thiophenols respectively.

The polybenzimidazoles contain recurring structural units

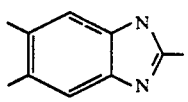

and are formed on reaction of di(o-diamines) with dicarboxylic acids.

Preferred polycondensates with N-containing heterocyclic ring systems are polyimides which contain recurring structural units

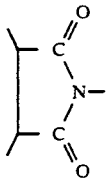

and which are obtainable, for example, by reacting tetracarboxylic dianhydrides with diamines or diisocyanates.

Also preferred are precursors of the polyimides. These precursors are polyamidic acids containing recurring structural units

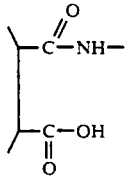

in which ring closure to form the polyimide is not yet complete.

Particularly suitable tetracarboxylic dianhydrides from which polyimides or polyamidic acids are obtainable are those having a total of 8 to 20 carbon atoms in the case of aliphatic tetracarboxylic dianhydrides and having 10 to 20 carbon atoms in the case of aromatic tetracarboxylic dianhydrides. Preference is given to dianhydrides of aromatic tetracarboxylic acids, in particular of pyromellitic acid, 3,3',4,4'-biphenyl-tetracarboxylic acid, 2,2',4,4'-biphenyltetracarboxylic acid, di(-dicarboxydiphenyl)methane, di(carboxydihydroxyphenyl)methanes and benzophenonetetracarboxylic acid.

Particularly suitable diamino compounds from which polyimides or polyamidic acids are obtainable have a total of 2 to 20 carbon atoms in the case of aliphatic diamino compounds and 6 to 20 carbon atoms in the case of aromatic diamino compounds. Preference is given to aromatic diamino compounds, in particular 4,4'-diaminodiphenyl oxide, 3,3'-dimethylbenzidine, 3,3'-dimethoxybenzidine, 4,4'-diaminobenzophenone, 4,4'-diaminobiphenyl, 4,4'-isopropylenedianiline, diaminotoluenes, 4,4'-diaminodiphenylmethane, 4,4'-diaminodiphenyl sulfone and 2,2-bis(4-aminophenoxy)-phenylpropane.

Suitable or preferred diisocyanates for the preparation of polyimides are preferably diisocyanates which correspond to the diamines and contain isocyanate groups instead of amino groups. Also suitable are diisocyanates which contain amino groups in addition to the isocyanate groups, for example 9,9-bis(4-aminophenyl)-fluorene diisocyanate.

The polycondensates and their precursors may also contain ethylenically unsaturated groups, so that curing of the coatings can also take place photochemically. For example, unsaturated alcohols, such as allyl alcohol, can be reacted with tetracarboxylic dianhydrides in order to bond the unsaturated groups to the polymer in this way.

In this case, a content of from 0.01 to 2 mol, preferably from 0.05 to 1.5 mol, of ethylenically unsaturated groups, based on 500 g of polycondensate or precursors thereof, has proved particularly suitable.

Another way of rendering the polycondensates or precursors thereof radiation-crosslinkable is to incorporate benzophenone or derivatives thereof into the polymer structure. The content of these carbonyl compounds is likewise 0.01 to 2 mol, preferably 0.05 to 1.5 mol, based on 500 g of polycondensate or precursors thereof, if photochemical crosslinking is desired.

In order to improve the adhesion of the polycondensates or precursors thereof to a wide variety of substrates, the mixture of azidosilanes and aminoalkoxysilanes can first be applied to the surface of the substrates. The azidosilanes and aminoalkoxysilanes may suitably be dissolved in an alcoholic solution, which may contain small amounts of water. Particularly suitable alcohols are $C_1$-$C_8$-alkanols, e.g. ethanol or isopropyl alcohol. The proportion of water in the solvent is preferably from 0.5 to 10% by weight. The solutions should be freshly prepared just before their further use, since otherwise higher condensed silicon derivatives may form after at least partial hydrolysis of the alkoxy groups.

However, it is also possible to dissolve the mixtures according to the invention in a non-hydrolyzing solvent, e.g. a hydrocarbon or ketone, and to apply the solution to the substrate. In this case, it is advisable to expose the adhesion promoter-coated substrates to air for some time before application of the polycondensates, in order to effect at least partial hydrolysis of the alkoxy groups by means of atmospheric moisture.

The amount of adhesion promoter is generally selected so that a coating having a thickness of a few molecular lengths is applied to the substrate surface. In general, as known by a person skilled in the art, a unimolecular coating is sufficient. For application, the azidosilane and aminoalkoxysilane may be in separate solutions or as a mixture in one solution.

Preference is given to from 0.001 to 0.1% strength by weight solutions of the azidosilane, aminoalkoxysilane or of a mixture of the two, it being preferred to apply from 0.0005 to 0.5 g of the solutions per square centimeter of substrate surface.

After the solutions have been applied and distributed on the substrate surface, the solvent can be evaporated at elevated temperature.

The polycondensate, which is suitably in an organic solvent, can then be applied and the solvent likewise removed by increasing the temperature.

Suitable solvents, in particular also for polyimides or polyamidic acids have proven to be phenolic solvents, e.g. cresol, and amidic solvents, such as dimethylformamide, dimethylacetamide and N-methylpyrrolidone.

Particularly suitable substrates are inorganic substrates, e.g. metals in the form of metal wires, glass fibers and quartz fibers, and silicon (wafers). Adhesion is particularly advantageous to substrates based on silicon. In particular, very good adhesion of the coating can also be achieved to surface-modified silicon (silicon dioxide or silicon nitride surface by treatment with oxygen or nitrogen respectively).

As the examples below show, equally good adhesion results can be achieved for chemically very different polyimides or polyamidic acids.

EXAMPLES

Preparation of Polyamidic Acid (PAA) Solutions 0.25 mol of the aromatic diamine indicated below were dissolved in N-methylpyrrolidone (NMP) at room temperature in a dry three-neck stirred flask. The amount of NMP was selected so that the polymer concentration in the full batch was 20%.

This solution was warmed to 50° C. under a gentle stream of dry nitrogen, and 0.25 mol of the aromatic dianhydride indicated below was then stirred into the solution in ten approximately equal portions at intervals of 10 minutes. The mixture was stirred at 60° C. for a further hour an then cooled to room temperature.

| PAA 1 | |
|---|---|
| Diamine: | 4,4-diaminodiphenyl ether |
| Dianhydride: | pyromellitic anhydride |
| Solution viscosity of the resultant solution | 6400 mPas (25° C.). |
| PAA 2 | |
| Diamine: | 2,2-bis(aminophenoxy)phenyl-propane (BAPP) |
| Dianhydride: | hexafluoroisopropylidene-2,2-bisphthalic dianhydride (6F-DA) |
| Solution viscosity of the resultant solution | 5940 mPas (25° C.). |
| PAA 3 | |
| Diamine: | 4,4-diaminodiphenyl sulfone/BAPP (molar ratio 1:1) |
| Dianhydride: | benzophenonetetracarboxylic dianhydride |
| Solution viscosity of the resultant solution | 7280 mPas (25° C.). |

Preparation of a Dissolved Polyimide (PI)

80.5 g of benzophenone tetracarboxylic dianhydride were suspended in 282 g of NMP at room temperature in a dry three-neck stirred flask. 22.25 g of a tolylene diisocyanate isomer mixture were added, and the mixture was heated to 160° C. over the course of 3 hours under a gentle stream of dry nitrogen. A brown, approximately 25% strength PI solution was obtained, with a viscosity of 3870 mPas.

Adhesion Test on Silicon Wafers

The following adhesion promoter solutions were first prepared.

AP1: Aminopropyltriethoxysilane (AMPS) 0.03% strength by weight in ethanol/water 9:1 (proportions by weight)

AP2: Azidopropyltriethoxysilane (AZPS) 0.03% strength by weight in ethanol/water 9:1 (proportions by weight)

AP3: AMPS and AZPS in the weight ratio 1:1 0.03% strength by weight in ethanol/water 9:1 (proportions by weight).

Each of the adhesion promoter solutions were applied to silicon wafers. The adhesion promoter was distributed on the wafer by rapid rotation of the latter. The wafers were subsequently dried at 100° C.

To apply the polymer solutions, preliminary experiments were carried out to determine the rotational speed of the silicon wafers necessary to obtain a dry coating thickness of about 5 μm.

The polymer solutions were spin-coated at the predetermined rotational speed onto the wafers pretreated with the adhesion promoter solutions, and the coatings were dried under reduced pressure at 90° C. for 20 minutes, then at 150° C. for 30 minutes, then at 200° C. for 30 minutes and finally at 300° C. for 60 minutes.

The test specimens were kept in the ambient atmosphere for 48 hours and then tested for adhesion.

A second series was likewise kept in the ambient atmosphere for 48 hours, but then boiled for 4 hours in demineralized water. The test specimens were dried off immediately after removal from the water and tested for adhesion.

In the adhesion test, the polymer coatings were scored in a criss-cross pattern using a sharp knife, with the score marks about 1 cm in length and 1 mm apart. The adhesion was tested by sticking Tesa ® film onto the specimens and then removing same.

Assessment was carried out in accordance with an internal key, in which scores 2–4 denote intermediate stages between score 1=perfect adhesion and score 5=residue-free non-adhesion.

TABLE 1

| | | Test Results | |
|---|---|---|---|
| | | Adhesion score | |
| Polymer | Adhesion promoter solution | after storage in the ambient atmosphere | after additional boiling test |
| PAA 1 | — | 5 | 5 |
| PAA 1 | AP 1 | 1 | 2 |
| PAA 1 | AP 2 | 4 | 5 |
| PAA 1 | AP 3 | 1 | 1 |
| PAA 2 | — | 4 | 5 |
| PAA 2 | AP 1 | 3 | 3 |
| PAA 2 | AP 2 | 1 | 1 |
| PAA 2 | AP 3 | 1 | 1 |
| PAA 3 | — | 5 | 5 |
| PAA 3 | AP 1 | 3 | 4 |
| PAA 3 | AP 2 | 1 | 1 |
| PAA 3 | AP 3 | 1 | 1 |
| PI 1 | — | 5 | 5 |
| PI 1 | AP 1 | 4 | 5 |
| PI 1 | AP 2 | 1 | 3 |
| PI 1 | AP 3 | 1 | 1 |

We claim:

1. An inorganic substrate coated with an adhesion promoter comprising a mixture of from 5 to 95% by weight of an azidosilane of the formula

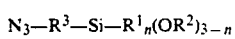 (I)

where $R^1$ is $C_1$-$C_3$-alkyl, phenyl, benzyl or tolyl, $R^2$ is $C_1$-$C_4$-alkyl, $C_2$-$C_4$-alkoxyalkyl, phenyl or benzyl, $R^3$ is $C_1$-$C_8$-alkylene, which may be interrupted by —($-N-R^4$)— in which $R^4$ is hydrogen, methyl, ethyl or phenyl, and n is 0, 1 or 2, and from 5 to 95% by weight of an aminoalkoxysilane of the formula

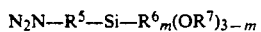 (II)

where $R^5$ is $C_1$-$C_6$-alkylene, $C_5$-$C_6$-cycloalkylene or $C_5$-$C_6$-arylene, each of which may be substituted by one or two $C_1$-$C_3$-alkyl groups, and $R^6$ and $R^7$, independently of one another, are $C_1$-$C_6$-alkyl or $C_5$-$C_6$-cycloalkyl, each of which may likewise be substituted by one or two $C_1$-$C_3$-alkyl groups, and m is 0, 1 or 2.

2. An inorganic substrate as claimed in claim 1, wherein the azidosilane is azidopropyltriethoxysilane and the aminoalkoxysilane is aminopropyltriethoxysilane.

3. An inorganic substrate as claimed in claim 2, wherein the weight ratio of azidopropyltriethoxysilane to aminopropyltriethoxysilane is 1:1.

* * * * *